D. A. BRUNETT.
HORSE DETACHER.
APPLICATION FILED MAY 16, 1907.

904,505.

Patented Nov. 24, 1908.

Witnesses

Inventor
D. A. Brunett,
By
Attorneys

UNITED STATES PATENT OFFICE.

DEWITT A. BRUNETT, OF RICE LAKE, WISCONSIN.

HORSE-DETACHER.

No. 904,505. Specification of Letters Patent. Patented Nov. 24, 1908.

Application filed May 16, 1907. Serial No. 373,935.

*To all whom it may concern:*

Be it known that I, DEWITT A. BRUNETT, a citizen of the United States, residing at Rice Lake, in the county of Barron, State of Wisconsin, have invented certain new and useful Improvements in Horse-Detachers; and I do hereby declare the following to be a full, clear, and exact description of the invention, such as will enable others skilled in the art to which it appertains to make and use the same.

This invention relates to horse releasers and has for its object to provide a simple device of this character which will also enable a horse to be quickly hitched to a vehicle as well as quickly released.

In carrying out my invention, I have provided a novel form of trace hook which comprises a fixed member and a pivoted member, the latter being held in position to connect the traces with the whiffle-tree by means of a leaf spring which is adapted to be sprung out of engagement with the said member to release the same and disconnect the traces from the whiffle-tree.

Figure 1:
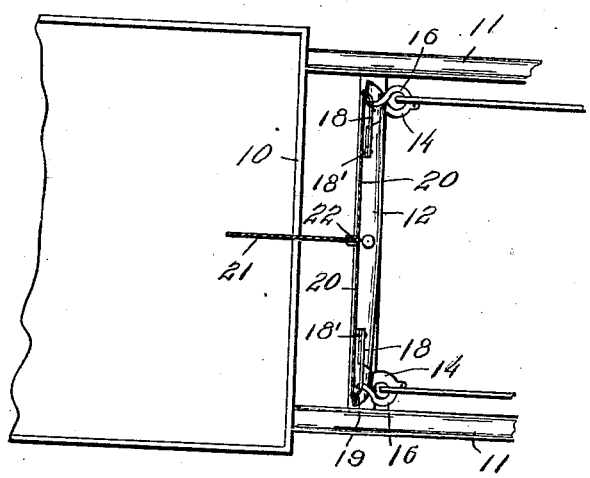
Figure 2:
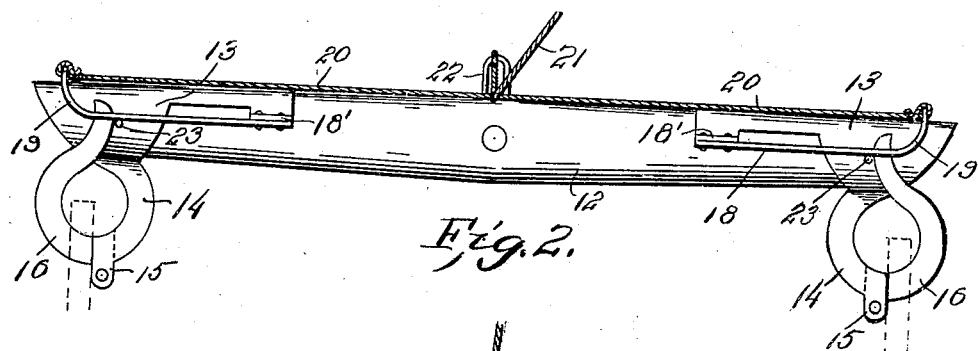
Figure 3:
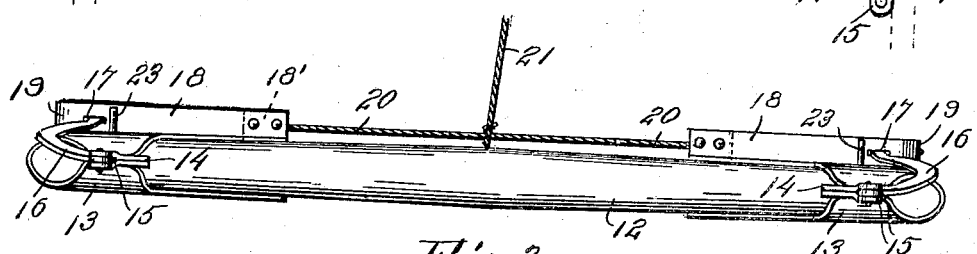

In the accompanying drawings—Figure 1 is a top plan view of the forward portion of a vehicle showing the application of my invention thereto. Fig. 2 is a detail top plan view of the whiffle-tree. Fig. 3 is a front elevation thereof. Fig. 4 is an end view of the whiffle-tree. Fig. 5 is a vertical sectional view taken in a plane with the end of the pivoted member of the hook, and, Fig. 6 is a detail side elevation of one of the shafts of the vehicle.

In the accompanying drawings, there is shown a vehicle including the usual dashboard 10, the shafts 11, and the whiffle-tree 12, the latter being mounted in the usual manner and being provided at each of its ends with one of the trace hooks embodied in my invention.

Each of the trace hooks comprises a plate which is bent to form a sleeve 13 encircling the whiffle-tree. Adjacent to one end of the sleeve ears 14 project from the meeting edges of the plate to form the shank of the hook, and between these ears is pivoted, as indicated at 15, the bill 16 of the hook. The shank and bill are each substantially semicircular as shown, and normally the free end of the bill is adapted to enter an opening 17 formed in the outer end of the flat spring 18. This spring is secured at its inner end to an ear 18' projecting from one of the aforesaid edges of the plate and extending at substantially right angles to the ears 14. The outer end of each of the leaf springs is curved rearwardly, as indicated by the numeral 19, so that when hitching the horse to the vehicle, the traces of the harness may be engaged with the pivoted member or bill of the hook and the said member then swung into engagement with the latch. The latch, of course, prevents the pivoted member swinging outwardly and consequently the traces will be held connected to the whiffle-tree until such time as the latches are sprung out of engagement with the pivoted members of the hooks.

In order that the movement of the latches, mentioned above, may be accomplished, there is connected to the outer end of each latch a rope or other flexible connection 20, these ropes being secured at their opposite ends to a rope 21, which is secured at one of its ends to a staple or eye 22 upon the whiffle-tree and leads into the vehicle in connection with which the device is used. As shown, the ropes 20 are not connected to the end of the rope 21 but to it at a point adjacent its end which is secured to the staple, the arrangement being such that even a hard pull upon the rope 21 will only move the spring latches a distance sufficient for their disengagement from the pivoted members of the hooks. This effectually prevents breaking of the spring latches. A pin 23 projects upwardly from each of the sleeves and limits the forward movement of the spring latches.

What is claimed, is—

A whiffle-tree hook comprising a plate bent to form a sleeve encircling the whiffle-tree, ears projecting from the meeting edges of the plate and shaped to form the shank of the hook, a bill pivoted between said ears, an ear projecting from one of the aforesaid edges of the plate and extending at substantially right angles to the first mentioned ears, a spring connected at one end to the aforesaid ear, and having an opening to receive the point of the bill, and means connected to the other end of the spring for operating the same to release the bill.

In testimony whereof, I affix my signature, in presence of two witnesses.

DEWITT A. BRUNETT.

Witnesses:
F. A. TATE,
JOSEPH BROWN.